United States Patent [19]

Asano

[11] Patent Number: 4,778,200
[45] Date of Patent: Oct. 18, 1988

[54] EMERGENCY SAFETY DEVICE FOR AUTOMATIC SEAT BELT SYSTEM

[75] Inventor: Shuichi Asano, Kawasaki, Japan

[73] Assignee: Nippon Seiko Kabushiki Kaisha, Tokyo, Japan

[21] Appl. No.: 921,239

[22] Filed: Oct. 21, 1986

[51] Int. Cl.⁴ ............................................. A62B 35/00
[52] U.S. Cl. ................................................... 280/804
[58] Field of Search ................ 280/801, 802, 804, 806

[56] References Cited

U.S. PATENT DOCUMENTS

| 4,223,915 | 9/1980 | Tanaka et al. | 280/804 |
| 4,394,035 | 7/1983 | Sato | 280/804 |
| 4,555,127 | 11/1985 | Kawai | 280/806 |

FOREIGN PATENT DOCUMENTS

| 45841 | 4/1976 | Japan. | |
| 8593 | 1/1980 | Japan. | |
| 71643 | 6/1981 | Japan | 280/801 |
| 20498 | 5/1984 | Japan. | |

Primary Examiner—John J. Love
Assistant Examiner—Ross Weaver
Attorney, Agent, or Firm—Wegner & Bretschneider

[57] ABSTRACT

An emergency safety device is provided for an automatic seat belt system. The safety device includes switch means for actuating an electrical drive means so as to bring the webbing to an occupant-releasing position when an associated door is opened while the webbing is at the occupant-restraining position; and means for sensing an emergency, thereby to prevent mechanically the switch means from actuating the electrical drive means and to hold the webbing as is at an occupant-restraining position even if the door should open.

8 Claims, 6 Drawing Sheets

EMERGENCY SAFETY DEVICE FOR AUTOMATIC SEAT BELT SYSTEM

BACKGROUND OF THE INVENTION

Field of the Invention

This invention relates to an emergency safety device for preventing a webbing from beginning to move toward an occupant-releasing position and hence for restraining an occupant in safe even if the door should open in the event of an emergency such as collision in an automatic seat belt system of the type that the webbing, which has been at an occupant-restraining position, is caused to move to the occupant-releasing position upon opening of the associated door.

The following problems have been pointed out with respect to automatic seat belt systems of the type that upon opening of an associated door, electrical drive means begins to operate so as to bring a webbing, which has been at an occupant-restraining position, toward an occupant-releasing position. An automatic seat belt system is generally convenient as an occupant is released automatically upon opening of the door. It is however not always so. When the door opens and the webbing begins to move toward the occupant-releasing position due to application of an impact to the vehicle body or tumbling of the vehicle body as a result of a collision or the like, there is a potential danger that the occupant may be released from the restraint and may no longer be protected in safe although the occupant is supposed to be restrained without failure in such an emergency.

In order to avoid such dangers, it may be contemplated to prevent the electrical drive means from beginning to operate even if the door should open in such an emergency. If one attempts to achieve this electrically as the drive means is electrical, a control circuit and wiring are required for the above purpose. This is certainly undesirable in both structure and price. Another method may also be contemplated to hold a runner or the like, which serves to move a webbing, without preventing an electrical drive means from beginning to operate. This approach is however troublesome because an undue load is applied to a motor or the like in the electrical drive means.

SUMMARY OF THE INVENTION

With the foregoing in view, the present invention has as its principal object the provision of an emergency safety device for an automatic seat belt system, which is simple in structure and relatively low in price and can protect individual elements of its structure from undue loads.

In one aspect of this invention, there is thus provided an emergency safety device for an automatic seat belt system in which a webbing is suitably and selectively displaceable between an occupant-restraining position and an occupant-releasing position, comprising:
 switch means for actuating an electrical drive means so as to bring the webbing to the occupant-releasing position when an associated door is opened while the webbing is at the occupant-restraining position; and
 means for sensing an emergency, thereby to prevent mechanically the switch means from actuating the electrical means and to hold the webbing as is at the occupant-restraining position even if the door should open.

In another aspect of this invention, there is also provided an emergency safety device for an automatic seat belt system, comprising:
 a guide rail;
 a runner movable along the guide rail between an occupant-restraining position where an associated webbing restrains an occupant and an occupant-releasing position where the webbing is maintained out of contact with the occupant;
 drive means for causing the runner to move between the occupant-restraining position and the occupant-releasing position, said drive means including switch means which is brought into a first state in response to each opening of an associated door and into a second state in response to each closure of the associated door, and said runner being caused to move toward the occupant-releasing position whenever the switch means is brought into the first state; and
 means for sensing an emergency state of an associated vehicle and causing the switch means to assume a position where the switch means is prevented from being brought into the first state.

In a further aspect of this invention, there is also provided an emergency safety device for an automatic seat belt system, comprising:
 a guide rail;
 a runner movable along the guide rail between an occupant-restraining position where an associated webbing restrains an occupant and an occupant-releasing position where the webbing is maintained out of contact with the occupant;
 drive means for causing the runner to move between the occupant-restraining position and the occupant-releasing position, said drive means including switch means which generates an electrical signal to bring the runner on the side of the occupant-releasing position in response to each closure of an associated door; and
 means for sensing an emergency state of an associated vehicle and preventing the switch means from generating the signal in the event of the emergency.

Since the actuation of the switch means due to opening of the associated door in the event of an emergency is mechanically prevented by the emergency-sensing means in the present invention, any extra electrical wiring and element are required, leading to advantages in both structure and price. The emergency safety devices of this invention seldom develop trouble as the runners are not forcedly stopped.

BRIEF DESCRIPTION OF THE INVENTION

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
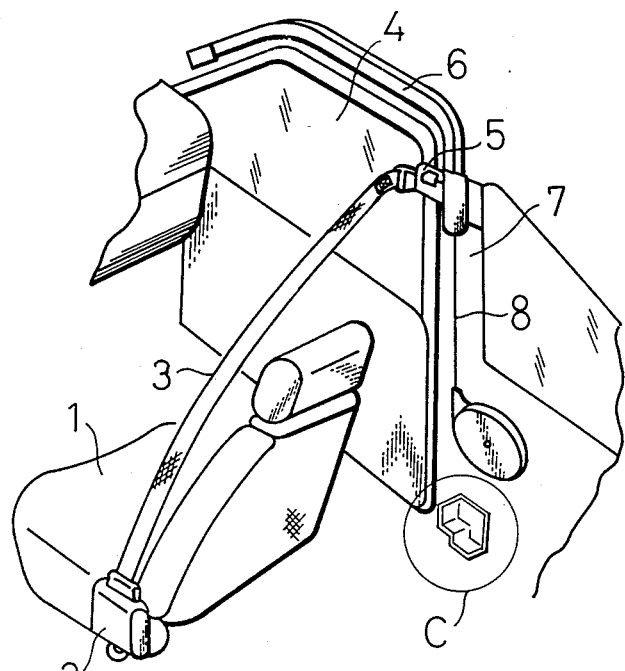
FIG. 1 is a perspective view showing one example of the overall structure of an automatic seat belt system.

In FIG. 1 illustrating one example of automatic seat belt systems, a diagonal webbing 3 extending out from a retractor 2 mounted inboard a seat 1 is fastened at the outer extremity thereof on a runner 5 arranged on the side of a vehicle body above a door 4. The runner 5 is caused to move slidingly along a guide rail 6 which extends as shown in the drawing. The runner 5 assumes an occupant-releasing position when the runner 5 has reached the front end of the guide rail 6. When the runner 5 has moved to the rear end of the guide rail 6 and reached a point somewhat the way down along a center pillar 7, the runner 5 assumes an occupant-restraining position. The runner 5 is driven by causing a drive member 8, which is connected to the runner 5, to move by means of a motor or the like. An emergency safety device according to the first embodiment of this invention is provided at a position indicated by a circle C in FIG. 1.

Figure 2:
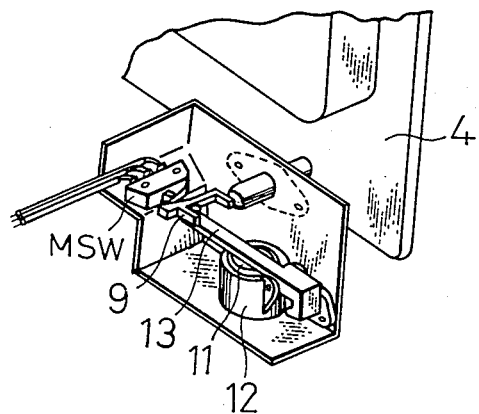
FIG. 2 is an enlarged perspective view of an emergency safety device according to a first embodiment of this invention, which has been incorporated in the automatic seat belt system of FIG. 1.

As depicted in FIG. 2, the emergency safety device includes a microswitch MSW incorporated in a runner control circuit, an actuator 9 movable in response to the opening or closure of the door 4, an inertia-sensing member 11 as emergency sensing means for detecting an emergency such as collision, a support 12 for the inertia-sensing member 11, and an arm 13 provided swingably on the support 12.

Figure 3:
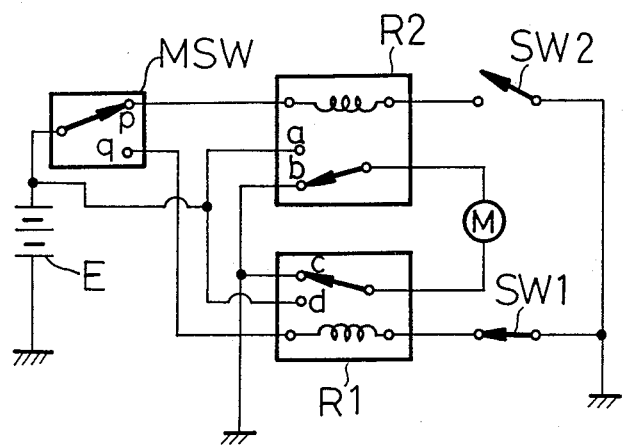
FIG. 3 is a diagram of a circuit suitable for use in the automatic seat belt system of FIG. 1 in order to control the seat belt system.

Referring now to FIG. 3, the control circuit for the runner 5 will be described.

In the circuit diagram shown in FIG. 3, there are shown a power supply E such as a battery of a vehicle, a microswitch MSW as a switch main body of switch means, relays R1, R2, a front-end limit switch SW1 which is normally closed but is opened only when the runner 5 is at the front end of the rail 6, namely, at the occupant-releasing position, a rear-end limit switch SW2 which is also closed normally but is opened only when the runner 5 is at the rear end of the rail 6, namely, at the occupant-restraining position, and a motor M for driving the runner 5 via the drive member 8.

In the state shown in FIG. 3, the runner 5 is located at the rear end of the rail 6 and the door 4 is closed. In this state, the relays R1, R2 are both in de-energized state and the levers of these switches are on the terminal b and the terminal c respectively. Accordingly, no current is being fed to the motor M and the runner 5 is hence held at the occupant-restraining position. When the seat 1 is occupied, the occupant is therefore restrained by the seat belt system. When the door 4 is opened here, the microswitch MSW is changed over from the "close" terminal (identified by letter p in FIG. 3) to the "open" terminal (identified by letter q in FIG. 3) and a current is fed to the relay R1 so as to change over its switch lever from the terminal c to the terminal d. The other elements remain in the same state as in FIG. 3. As a consequence, a current is fed from the power supply E to the motor M in an upward direction as viewed in FIG. 3, whereby the motor M begins to rotate in a direction, the drive member 8 is paid out frontward as viewed in FIG. 1 and the runner 5 starts moving toward the front end of the rail 6. Although the switch SW2 is also closed at this stage, the relay R2 is not energized because the microswitch MSW has been switched over to the "close" terminal. Hence, the switch lever of the relay R2 remains at the side b.

As soon as the runner 5 reaches the occupant-releasing position at the front end of the rail 6, the switch SW1 is opened to de-energize the relay R1. Accordingly, the switch lever of the relay R1 is again switched over to the terminal c and the motor M is stopped. When the occupant then gets off the seat 1 and closes the door 4, the microswitch MSW is again switched over to the "close" terminal and the relay R2 is energized to switch over its switch lever to the terminal a. As a result, the current is fed from the power supply E in the downward direction as viewed in FIG. 3, whereby the motor M is rotated in the opposite direction. Accordingly, the drive member 8 is rewound in the rearward direction as viewed in FIG. 1 so that the runner 5 is moved to the occupant-restraining position at the rear end of the rail 6 to take the state shown in FIG. 3 again.

Since the door 4 is opened when the occupant gets on the vehicle, the runner 5 is once caused to move toward the front end of the rail 6 as apparent from the above description. When he sits on the seat 1 and closes the door 4, the runner 5 is caused to move back to the rear end of the rail 6 and hence assumes the occupant-restraining position.

The first embodiment of this invention shown in FIG. 2 will next be described in further detail with reference to FIG. 4.

The actuator 9 has an acting portion 9a which acts on a button 22 via a lead 21 so as to switch over the microswitch MSW as described above, a rod portion 9b displaceable in accordance with the opening and closure of the door 4, and an engagement portion 9c engageable with an eminence 13a formed on the arm 13 which constitutes emergency sensing means together with the inertia sensing member 11. Within a housing 23 of the emergency safety device mounted on the vehicle body depicted in FIG. 1, there is fixedly discloses a cylindrical casing 24 through which a rod portion 9b of the actuator 9 extends. By a spring 25 also housed as biasing means in the casing 24, the actuator 9 is normally biased rightwards as viewed in FIG. 4, namely, toward the door 4 and is displaceable within a preset stroke.

Figure 4:
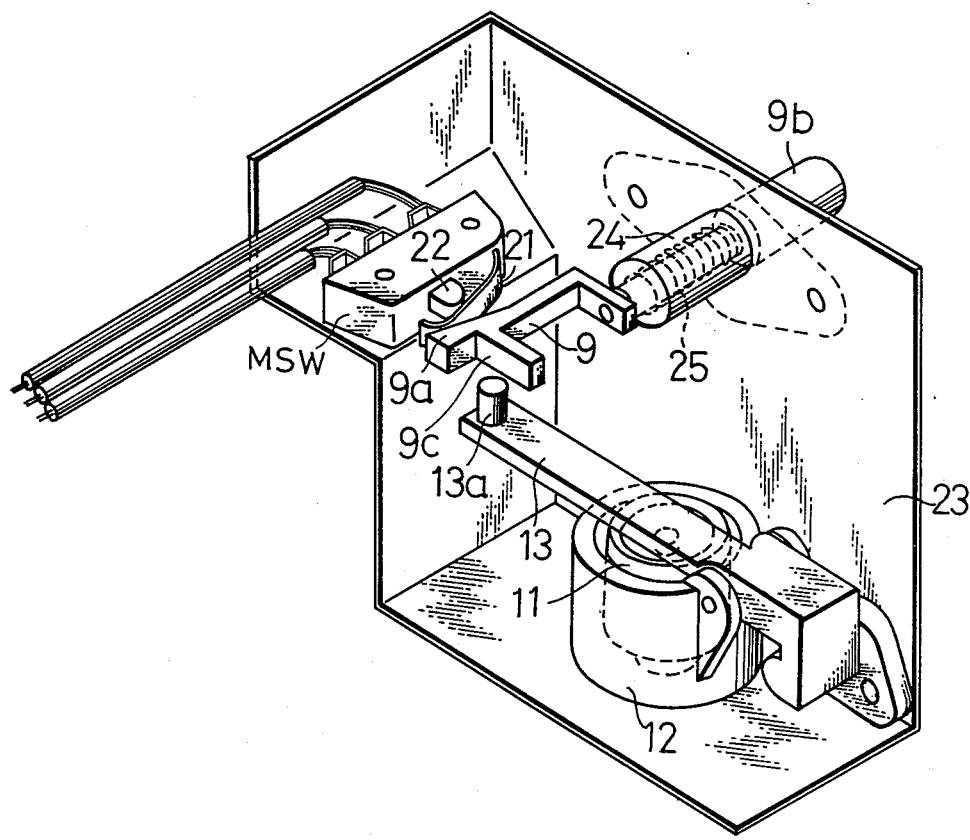
FIG. 4 through FIG. 6 are detailed perspective views of the emergency safety device of FIG. 2, illustrating the operation of the emergency safety device in different stages.

Normally, in other words, while the emergency sensing means does not detect any abnormal state such as collision, the inertia sensing means 11 takes its normal position, namely, is in an upright position as illustrated in FIG. 4 and the arm 13 is its normal position not lifted from the horizontal position. Therefore, the eminence 13a of the arm 13 is located off the path of movement of the actuator 9 and is unable to engage the engagement portion 9c. When the door 4 is closed in this state, the rod portion 9b is pushed by the door 4 against the biasing force of the spring 25 so that the actuator 9 moves in the leftward direction as viewed in FIG. 4. Since the acting portion 9a does not act on the button 22 via the lead 21, the microswitch MSW is in the state switched over to the "close" terminal as shown in FIG. 3. When the door 4 is closed, the actuator 9 is caused to move rightwards by the force of the spring 25 as depicted in FIG. 4 so that the acting portion 9a pushes the button 22 via the lead 21. Hence, the microswitch MSW is switched over to the "close" terminal in the circuit shown in FIG. 3. The operation of the seat belt system in accordance with the switching of the microswitch MSW has already been described above and is hence not described here.

Figure 5:
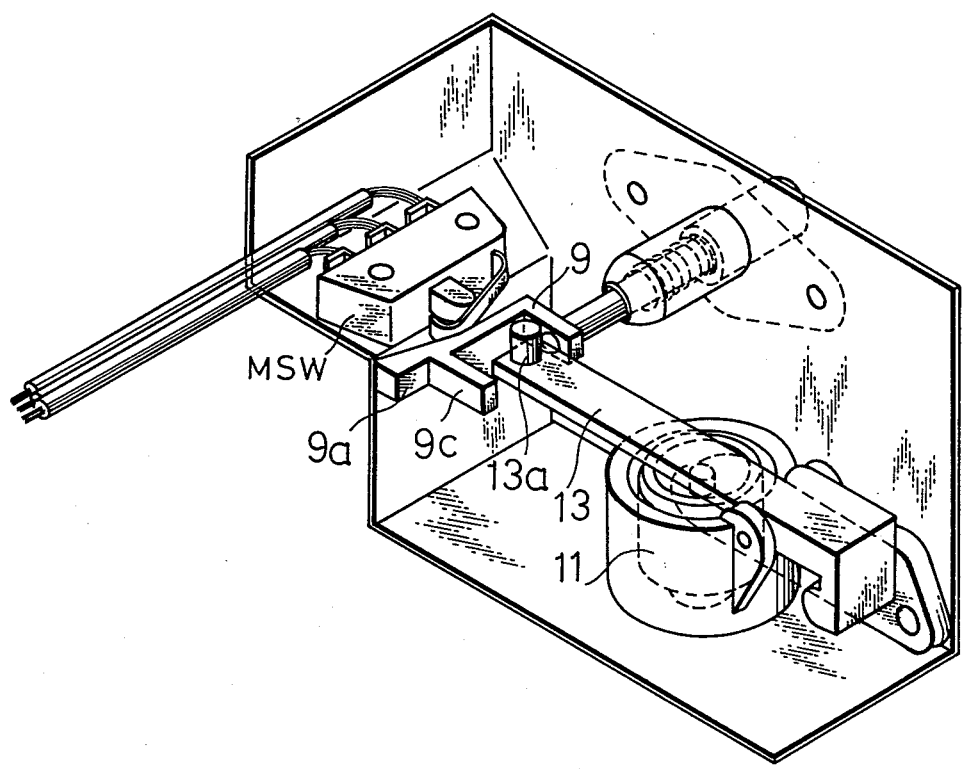

When the inertia sensing member 11 detects an abnormal state such as collision while the door 4 is closed, the inertia sensing member 11 is tilted to lift the arm 13. Then, the eminence 13a of the arm 13 is rendered engageable with the engagement portion 9c of the actuator 9 as shown in FIG. 5. Unless the door 4 opens, the actuator 9 remains at the same position as shown in FIG. 5 and the microswitch MSW retains its state switched over to the "close" side. Hence, the runner 5 is at the occupant-restraining position and the webbing 3 restrains the occupant in safe.

Figure 6:
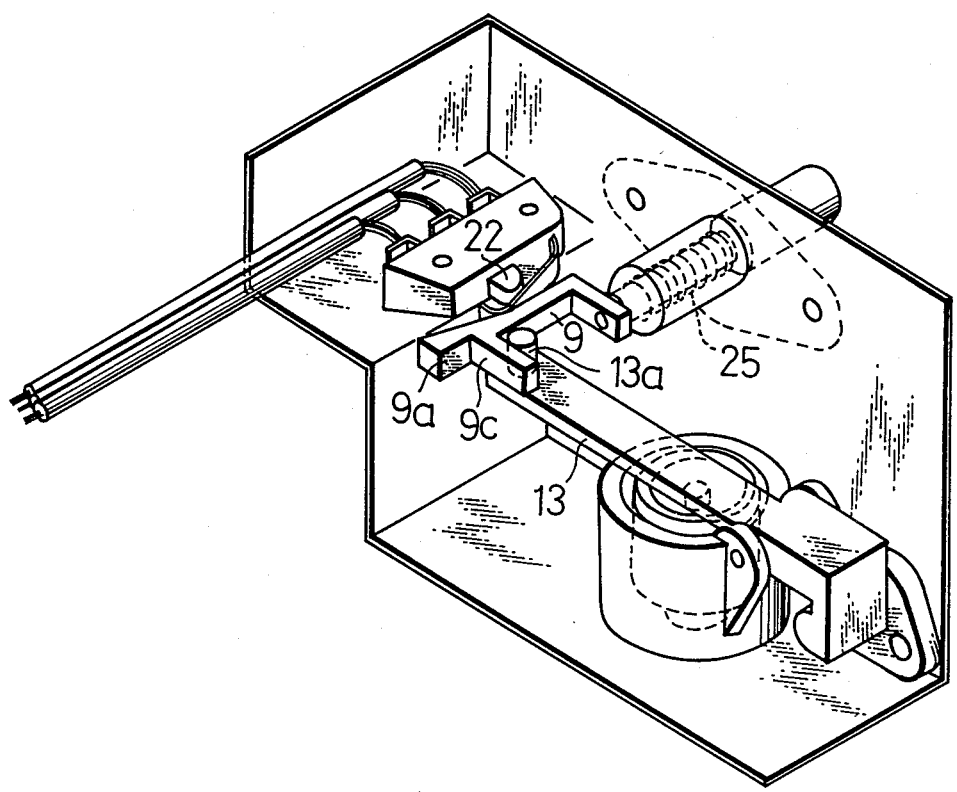

Let's however assume that the door 4 has opened in the above-described state. Then, the actuator 9 starts moving in the rightward direction by the force of the spring 25 as viewed in FIG. 6. In the course of the rightward movement of the actuator 9, the engagement portion 9c of the actuator 9 is brought into engagement with the eminence 13a of the arm 13 as shown in FIG. 6, whereby the actuator 9 cannot move rightwards after the engagement and the acting portion 9a does not push the button 22. Therefore, the emergency safety device is in the same state as that taken while the door 4 is closed. The runner 5 is hence not allowed to move frontward and the occupant is also restrained in safe by the webbing 3.

The occupant is therefore safely restrained without failure even if the door 4 should open in the event of an emergency.

Figure 7:
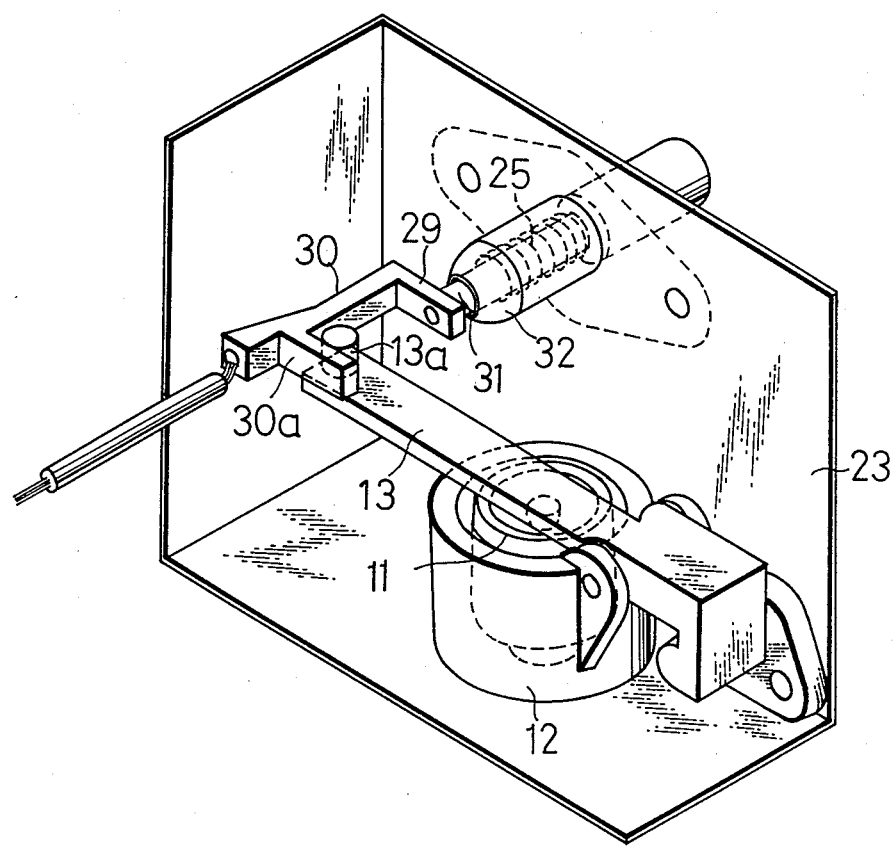
FIG. 7 is a detailed perspective view of an emergency safety device according to a second embodiment of this invention.

The second embodiment of this invention will next be described with reference to FIG. 7 and FIG. 8. As depicted in FIG. 7, the second embodiment does not employ any microswitch but in steads, an actuator 29 is composed of a conductive portion 30 and a rod portion 31 formed of an insulator. The conductive portion 30 has an engagement portion 30a. A cylindrical casing 32 is formed of a conductor and is grounded on the side of the vehicle body. Reflecting this modification, the runner control circuit is also different from that of the first embodiment and the conductive portion 30 and casing 32 constitute parts of the runner control circuit.

The remaining elements of structure are the same as their corresponding elements in the first embodiment. In FIG. 7, they are hence identified by the same numerals as in FIG. 4.

The operation of the second embodiment will next be described while also describing the runner control circuit depicted in FIG. 8.

Figure 8:
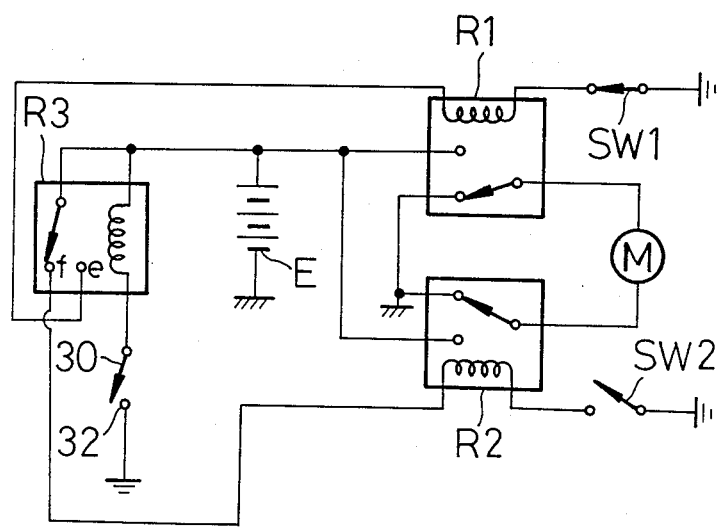
FIG. 8 is a diagram of a control circuit suitable for use with the emergency safety device according to the second embodiment of this invention.

In FIG. 8, there are shown a power supply E, limit switches SW1, SW2 similar to those shown in FIG. 3, relays R1, R2, R3, and a motor M. In the state depicted in FIG. 8, the runner is at the occupant-restraining position at the rear end of the rail 6 and the door is closed. Since the conductive portion 30 and casing 32 are separated from each other in the above state, the relay R3 is in its de-energized state and the switch SW2 is maintained open. Accordingly, the relay R2 is also in its de-energized state. Although the switch SW1 is closed, the relay R1 is also in its de-energized state because the switch lever of the relay R3 has been switched over to a terminal f. Therefore, the switch levers of the relays R1, R2 have been switched over to the lower side and upper side respectively in FIG. 8 and no current is fed to the motor M. Thus, the runner 5 remains at the rear end of the rail 6.

When the door 4 opens in the above state, the conductive portion 30 and casing 32 are normally brought into contact and the relay R3 is energized to switch over the switch lever to a terminal e. As a result, the relay R1 is energized and its switch lever is switched over to the upper side, and a current is hence fed to the motor M in the upward direction as viewed in FIG. 8 and the motor 5 is caused to start moving frontward. As soon as the runner 5 reaches the front end of the rail 6, the switch SW1 is opened and the relay R1 returns to its de-energized state. As a result, the switch lever of the relay R1 is switched over to the lower side to stop the motor M. When the door 4 is closed here, the conductive portion 30 and casing 32 are separated from each other and the relay R3 is brought into its de-energized state. The switch lever of the relay R3 is switched over to the terminal f and the relay R2 is hence energized. Accordingly, the switch lever of the relay R2 is switched over to the lower side and a current is fed upwardly to the motor M this time. The runner thus begins to move rearwards. Since the details of the circuit shown in FIG. 8 are substantially the same as that depicted in FIG. 3, no further description will be made of the circuit of FIG. 8.

When the inertia sensing member 11 detects an impact while the runner 5 is at the occupant-restraining position, the arm 13 is lifted as shown in FIG. 7 and the eminence 13a is hence rendered engageable with the engagement portion 30a of the actuator 29.

If the door 4 should open in the above state, the actuator 29 starts moving rightwards as viewed in FIG. 7 by the force of the spring 25. However, this rightward movement of the actuator 29 is stopped by the eminence 13a and the conductive portion 30 and casing 32 are not allowed to contact to each other. The relay R3 and hence the telay R1 are not energized. Therefore, the circuit is continuously maintained in the state shown in FIG. 8 and the runner 5 is held at the occupant-restraining position.

It should however be borne in mind that the above-described embodiments have been given merely by way of example. The manner of mechanical action of the emergency sensing means on the switch means may be modified in various ways.

The second embodiment may be modified, for example, in such a way that the casing 32 is rendered displaceable in accordance with the opening and closure of the door 4 instead of the conductive portion 30 and the eminence 13a of the arm 13 is engageable with the casing 32.

In the above embodiments, the switches are provided on the side of the vehicle body. They may however be mounted on the side of the door. When mounting them on the door, they may be provided at such a location that they can detect the actuation of the opening/closure mechanism for the door.

Having now fully described the invention, it will be apparent to one of ordinary skill in the art that many changes and modifications can be made thereto without departing from the spirit or scope of the invention as set forth herein.

I claim:

1. An emergency safety device for an automatic seat belt system in which a webbing is suitably and selectively displaceable between an occupant-restraining position and an occupant-releasing position, comprising:

door switch means, operated when an associated door is opened, for actuating an electrical drive means so as to bring the webbing to the occupant-releasing position from the occupant-restraining position; and means for sensing an emergency and mechanically preventing the door switch means from operating, thereby holding the webbing as is at the occupant-restraining position even if the door should open.

2. The emergency safety device as claimed in claim 1, wherein the sensing means comprises an inertia sensing member which is adapted for the detection of speed changes of a vehicle beyond a predetermined level.

3. An emergency safety device for an automatic seat belt system in a vehicle having an associated door in which a webbing is suitably and selectively displaceable between an occupant-restraining position and an occupant-releasing position, comprising:

switch means for actuating an electrical drive means so as to bring the webbing to the occupant-releasing position when the associated door is opened while the webbing is at the occupant-restraining position; and means for sensing an emergency, thereby to prevent mechanically the switch means from actuating the electrical drive means and to hold the webbing as is at the occupant-restraining position even if the door should open;

wherein the switch means is arranged within the vehicle and comprises an actuator biased by a biasing means, and wherein upon opening of the associated door, said switch means actuates the electric drive means owing to a recovering force applied to said actuator by said biasing means which has been in an energy-stored state, and the recovering force is prevented by the sensing means from acting on the switch means in the event of an emergency.

4. The emergency safety device as claimed in claim 3, wherein the switch means comprises a switch main body provided in a circuit inclusive of the electrical drive means, and said actuator is triggered by at least one of the associated door and said biasing means to act on the switch main body.

5. An emergency safety device for an automatic seat belt system, comprising:

a guide rail;

a runner movable along the guide rail between an occupant-restraining position where an associated webbing restrains an occupant and an occupant-releasing position where the webbing is maintained out of contact with the occupant;

drive means for causing the runner to move between the occupant-restraining position and the occupant-releasing position, said drive means including door switch means which is brought into a first state in response to each opening of an associated door and into a second state in response to each closure of the associated door, and said runner being caused to move toward the occupant-releasing position whenever the door switch means is brought into the first state; and means for sensing an emergency state of an associated vehicle and assuming a position so as to prevent the door switch means from being brought into the first state.

6. An emergency safety device for an automatic seat belt system, comprising:

a guide rail;

a runner movable along the guide rail between an occupant-restraining position where an associated webbing restrains an occupant and an occupant-releasing position where the webbing is maintained out of contact with the occupant;

drive means for causing the runner to move between the occupant-restraining position and the occupant-releasing position; said drive means including door switch means which is operated in response to each opening of an associated door and generates an electrical signal to bring the runner toward the occupant-releasing position; and means for sensing an emergency state of an associated vehicle and mechanically preventing the door switch means from operating in the event of the emergency.

7. The emergency safety device as claimed in claim 6, wherein the switch means is composed of a first and second members both of which are made of a conductor, one of the members is grounded through the body of the vehicle and the other member moves in association with movements of the associated door, and the switch means is brought into a first state or second state upon contact or separation of the members.

8. An emergency safety device for an automatic seat belt system, comprising:

a guide rail;

a runner movable along the guide rail between an occupant-restraining position where an associated webbing restrains an occupant and an occupant-releasing position where the webbing is maintained out of contact with the occupant;

drive means for causing the runner to move between the occupant-restraining position and the occupant-releasing position, said drive means including switch means which generates an electrical signal to bring the runner on the side of the occupant-releasing position in response to each closure of an associated door; and means for sensing an emergency state of an associated vehicle and preventing the switch means from generating the signal in the event of the emergency;

wherein the switch means includes an actuator to be triggered by the associated door, and in the event of an emergency of the vehicle, the emergency sensing means is caused to project out into the path of movement of the actuator so as to prevent the movement of the actuator.

* * * * *